Nov. 29, 1966 G. G. PICK 3,289,047

HOUSING FOR A MECHANICALLY ALTERABLE MEMORY SYSTEM

Filed Oct. 16, 1964

INVENTOR
GEORGE G. PICK

BY Spencer E. Olson

ATTORNEY

United States Patent Office 3,289,047

Patented Nov. 29, 1966

3,289,047

HOUSING FOR A MECHANICALLY ALTERABLE MEMORY SYSTEM

George G. Pick, Lexington, Mass., assignor to Sylvania Electric Products Inc., a corporation of Delaware Filed Oct. 16, 1964, Ser. No. 404,438
4 Claims. (Cl. 317—101)

Figure 1:
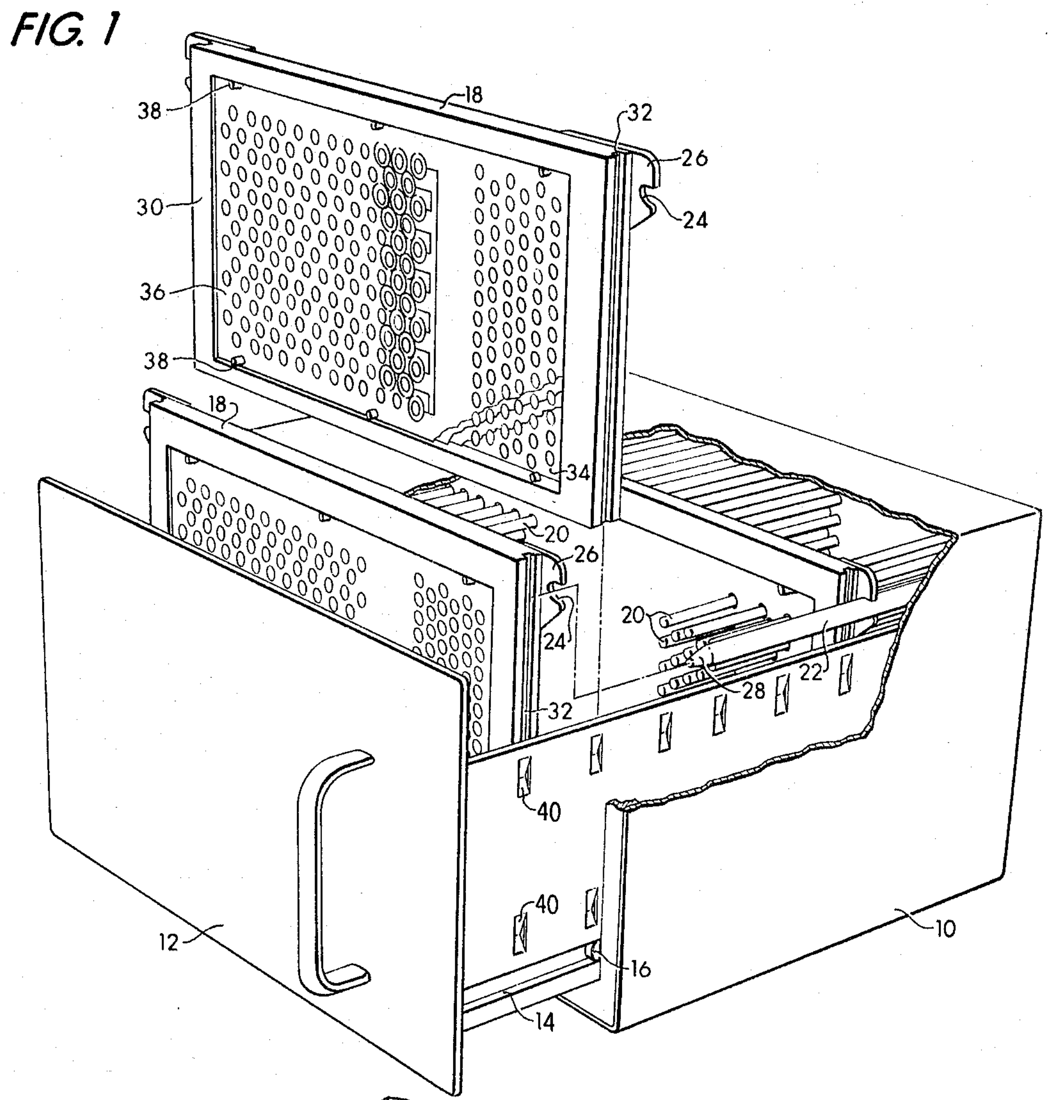

This invention relates to mechanically alterable memory systems and more particularly to apparatus for packaging such memory systems.

A memory system is disclosed in co-pending application S.N. 334,413, filed December 30, 1963, and assigned to the assignee of the present application, wherein an array of solenoids is employed in conjunction with a plurality of thin data planes to provide a permanent, mechanically alterable, random access memory. This memory system is described in detail in the above-identified co-pending application, and will be described herein only insofar as necessary to understand the present invention. Briefly, the system comprises a plurality of data planes, stacked one upon the other, each storing its own coded address and data word, and a plurality of elongated solenoids which pass through aligned openings in all of the planes. The address of each plane is stored on the plane by selectively arranging a plurality of etched coils to either surround or bypass a like plurality of addressing solenoids in accordance with an address code. The data storage portion of each plane has a plurality of similar etched coils each arranged to surround or bypass respective storage solenoids to represent a bit of a stored word. A surrounding patch represents a ONE while a bypass path represents a ZERO. The coils on the address portion of the plane and those on the data portion of the plane are connected in a series path through a diode.

When a word is to be read out of the memory, the addressing solenoids are energized in accordance with the address of the particular plane. The windings of these solenoids act as transformer primaries while each of the surrounding coils act as secondaries. The address code is arranged so that only the plane storing the correct address will produce a summation of positive signals in the address portion of the plane, with all others producing a null or negative signal. Accordingly, only the correct plane forward biases its diode and allows current to flow in the data storage portion of the plane. The coils on the storage portion of the plane act as transformer primaries while their solenoid windings act as secondaries. The signals sensed by the solenoids passing through the data portion of the planes represent the data content of the particular plane. A major advantage of this memory system is that the data planes are not physically connected to other circuitry and can therefore be easily changed by removing them from the solenoid array and inserting new ones. New sets of data or changes in existing data can, therefore, be stored in the memory system simply by changing appropriate data planes.

In a practical memory system several thousand data sheets are used, together with several hundred solenoids. The data sheets are made of thin plastic material, such as Mylar, which is extremely flexible. The alignment of the data planes with respect to the solenoid array is not electrically critical; however, a mechanical alignment problem is encountered in a memory system of practical size due to the great number of data planes and solenoids. It would be advantageous to have a means of mounting these data planes so that they can be easily removed from, and inserted into, the solenoid array. Accordingly, it is an object of the present invention to provide a packaging apparatus which will allow expedient removal of data planes from the solenoid array.

In accordance with the present invention, the memory system is housed in a structure much like a file cabinet in which the solenoids are secured to and extend horizontally from the back wall of a cabinet, and the data planes are slidably mounted vertically in a drawer which is removable from the cabinet. When the drawer is pulled from the cabinet, the planes are drawn from the solenoids allowing selected planes to be easily removed and changed. Positioning means are provided to assure accurate alignment between the solenoids and the planes before the solenoids are inserted through the planes.

Figure 2:
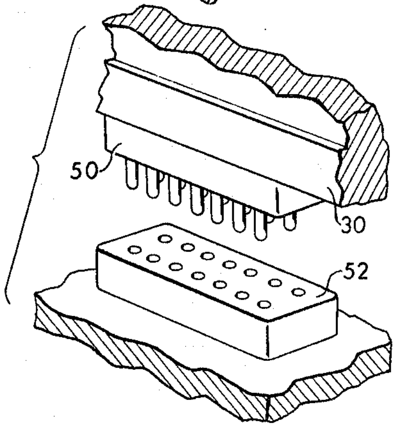

The construction and operation of the invention will be better understood from the following detailed description, taken in conjunction with the drawings in which:

FIG. 1 is a pictorial view, partly cut away, of a preferred embodiment of the invention; and FIG. 2 is a fragmentary pictorial view of a modification of the invention.

FIG. 1 illustrates a 262,144 bit memory system packaged according to the invention, and includes 316 solenoids which pass through 1024 data planes, contained in four magazines. Each data sheet is of the order of .002 inch thick, and has an etched conductive path approximately .0013 inch thick surrounding or bypassing 316 holes. It will be appreciated that these planes are extremely flexible, making insertion and removal of these planes over the large number of solenoids a cumbersome task. In usual memory systems of this type, a plurality of planes are normally required to store a particular set of data. Thus, it is often desirable to group an interrelated set of planes together to expedite their insertion in and removal from the memory system. To this end, groups of planes are packaged in respective magazines which can be easily and accurately aligned with the array of solenoids so that the data planes can be quickly and simply placed in operative position over the solenoids.

Referring to FIG. 12, there is shown a rectangular cabinet 10 having a drawer 12 slidably mounted therein, for example, by means of slides 14 and rollers 16, and a plurality of magazines 18 containing data planes removably mounted in drawer 12. A plurality of solenoids 20 are each secured at one end thereof to the back wall of cabinet 10 and extend horizontally into the interior of the cabinet. The solenoids are spaced to conform to the pattern of holes on the data planes and are of sufficient length to accommodate the number of planes required in a particular case. The solenoid windings are connected to associated circuitry from the mounted ends so that the distal ends are free to receive the data sheets. A pair of pins 22, longer than the solenoids, are secured at one end to the back wall of cabinet 10 and extend parallel to solenoids 20 along either side wall near the top, in a position to slidably mate with opening 24 in flange 26. The distal end of each of the pins has a tapered portion 28 which extends beyond the free end of solenoids 20, which serves to align the magazines with the solenoids, as will be further explained hereinafter.

Magazines 18 each consist of a rectangular frame 30 having grooves 32 cut in the side walls, and a back plate 34 having holes therein conforming in position and size to the holes on data sheets 36 which are mounted in the magazines by pins 38 upstanding from plate 34. Alternatively, the planes could be held in the magazines by a cover plate fitted into frame 30. The magazines are slidably mounted in drawer 12 by means of grooves 32 mate with corresponding tongues 40 provided on the sides of the drawer. Each magazine has a flange 26 including a semicircular opening 24 extending outwardly in the plane of the magazine at the top end of each side thereof.

The tapered end of pin 22 extends beyond solenoids 20 and, therefore, engages opening 24 in flange 26 before the magazine with the data planes passes over the solenoid array as the drawer is closed. The opening 24 is dimensioned to precisely fit the full diameter of pin 22 so that each magazine is accurately positioned relative to the solenoid array before it is pushed over the array. Any misalignment between the magazine, drawer 12, and the solenoids is corrected by the tapered portion 28 of pin 22 which guides respective flanges 26, and hence magazine 18, into precise engagement with the full diameter section of the pins. Thus, any misalignment that may exist is corrected by the positive engagement of pins 22 with flanges 26, thereby allowing the magazines with the data planes to be easily installed onto the array of solenoids. The degree of misalignment can be kept sufficiently small by careful construction so that tapered portion 28 of the pin will always engage the opening 24 in their respective flanges 26.

In a variation of the above-described memory system, described in co-pending application S.N. 334,413 filed December 30, 1963, data is read out of the planes via direct connection to the conductive paths. In this system, data is also stored on the planes via a conductive path which either surrounds or bypasses selected holes in the plane; however, the conductive path terminates in a connector to which operative connection is made. In operation, selected solenoids are energized to magnetically couple the portions of the conductive path surrounding the energized solenoids to thereby induce a voltage in the path which is representative of the data stored on the plane. The output signal is taken from respective ends of the path via suitable electrical connection. This type of memory system is housed in accordance with the invention, as shown in FIG. 2. Each magazine has a connector 50 mounted on the bottom panel 30 which makes electrical connection to the conductive path of each data plane contained within the magazine. This connector mates with its counterpart 52 mounted on the bottom of drawer 12, by which the planes are connected to associated logic circuitry.

From the foregoing, it is evident that simple and efficient packaging apparatus has been provided for a mechanically alterable memory system wherein data planes are easily changeable, and positive alignment between solenoids and data planes is maintained. While specific embodiments of the invention have been shown and described, it is not intended to thereby limit the scope of the invention, as alternative implementations and modifications will now occur to those versed in the art. Accordingly, the scope of the invention is not to be limited except as indicated in the appended claims.

I claim:

1. Packaging apparatus for a memory system which includes a plurality of data planes stacked one upon the other, and a plurality of elongated solenoids passing through all of said planes, said apparatus comprising, a rectangular cabinet having one open side therein, means for securing said solenoids to the side of said cabinet opposite said open side, said solenoids extending toward said open side, a drawer slidably mounted in the open side of said cabinet, means for removably mounting said data planes in said drawer orthogonal to said solenoids, and means for aligning said data planes with respect to said solenoids when said drawer is inserted into said cabinet.

2. Packaging apparatus for a memory system which includes a plurality of data planes stacked one upon the other, and a plurality of elongated solenoids passing through all of said planes, said apparatus comprising, a rectangular cabinet having one open side therein, means for securing said solenoids to the side of said cabinet opposite said open side, said solenoids extending toward said open side, a drawer slidably mounted in the open side of said cabinet, a plurality of magazine each containing a plurality of data planes, means for removably mounting said magazines in said drawer orthogonal to said solenoids, and means for aligning said data planes with respect to said solenoids when said drawer is inserted into said cabinet.

3. Packaging apparatus for a memory system which includes a plurality of data planes stacked one upon the other, and a plurality of elongated solenoids passing through all of said planes, said apparatus comprising, a rectangular cabinet having a back wall and an open front wall, means securing said solenoids on said back wall to extend from said back wall toward said open front wall, first and second cylindrical pins each having a tapered end portion, said pins being mounted on said back wall and disposed parallel to said solenoids and with said tapered portion extending beyond said solenoids, a drawer including a front, bottom, and two side walls mounted in said cabinet and slidable from the open face thereof, a plurality of magazines removably mounted in said drawer orthogonal to said solenoids and containing a plurality of said data planes, and first and second flanges secured to each magazine and extending beyond the periphery and in the plane thereof from respective top corners, each flange having a semi-circular opening therein dimensioned to intimately engage respective ones of said pins as said drawer is inserted into said cabinet, said flanges being initially engaged by the tapered portion of said pins as said drawer is moved into said cabinet to positively align said magazines with respect to said solenoids before said solenoids pass through said magazines.

4. Packaging apparatus for a memory system which includes a plurality of data planes stacked one upon the other and having a common configuration of holes therein, and a plurality of elongated solenoids corresponding in position to said configuration of holes and passing through all of said planes, said apparatus comprising, a rectangular cabinet including a back wall and an open front wall, means securing said solenoids to said back wall to extend from said back wall toward said open front wall, a pair of cylindrical pins each having a tapered end portion and secured to said back wall parallel with said solenoids with the tapered end portion extending beyond said solenoids and confronting said open wall, a drawer slidably mounted in said cabinet for insertion and withdrawal therefrom, a plurality of rectangular magazines dimensioned to contain a plurality of data planes in fixed relationship therein and having a panel containing a plurality of holes corresponding in position and size with the holes on said data planes, means for removably mounting said magazines in said drawer orthogonal to said solenoids with said holes in approximate alignment with said solenoids, each magazine having first and second flanges mounted on respective top corners thereof and extending beyond the periphery of said magazine in the plane thereof, each of said flanges having an opening therein dimensioned to intimately engage said respective pins, the opening in each of said flanges being initially engaged by the tapered end portion of respective pins to guide said flanges onto said pins before said solenoids are inserted through said magazines.

No references cited.

ROBERT K. SCHAEFER, *Primary Examiner.*

W. C. GARVERT, *Assistant Examiner.*